United States Patent [19]

Dvorkis

[11] Patent Number: 5,583,331
[45] Date of Patent: Dec. 10, 1996

[54] ARRANGEMENT FOR COMPENSATING FOR SCAN LINE CURVATURE

[75] Inventor: Paul Dvorkis, Stony Brook, N.Y.

[73] Assignee: Symbol Technologies, Inc., Holtsville, N.Y.

[21] Appl. No.: 378,902

[22] Filed: Jan. 24, 1995

Related U.S. Application Data

[63] Continuation-in-part of Ser. No. 111,525, Aug. 25, 1993, abandoned, which is a continuation-in-part of Ser. No. 812,922, Dec. 24, 1991, abandoned, which is a continuation-in-part of Ser. No. 520,464, May 8, 1990, Pat. No. 5,168,149, which is a continuation-in-part of Ser. No. 428,770, Oct. 30, 1989, Pat. No. 5,099,110.

[51] Int. Cl.$^6$ ............................................. G06K 7/10
[52] U.S. Cl. ........................ 235/462; 235/467; 359/199; 359/224
[58] Field of Search ................................ 235/462, 467; 359/198, 199, 214, 224, 225, 230, 846

[56] References Cited

U.S. PATENT DOCUMENTS

| | | |
|---|---|---|
| 1,202,446 | 10/1916 | Speed . |
| 1,552,186 | 9/1925 | Anderson . |
| 1,800,601 | 4/1931 | Centeno V. . |
| 1,873,926 | 8/1932 | Centeno V. . |
| 2,971,054 | 2/1961 | Holt, Jr. . |
| 2,989,643 | 6/1961 | Scanlon . |
| 3,087,373 | 4/1963 | Poor et al. . |
| 3,532,408 | 10/1970 | Dostal . |
| 3,642,343 | 2/1972 | Tchejeyan et al. . |
| 3,981,556 | 9/1976 | Sabatelli et al. . |
| 3,981,566 | 9/1976 | Frank et al. . |
| 3,998,092 | 12/1976 | Maccabee . |
| 4,021,096 | 5/1977 | Dragt . |
| 4,175,832 | 11/1979 | Umeki et al. . |
| 4,199,219 | 4/1980 | Suzuki et al. . |
| 4,251,798 | 2/1981 | Swartz et al. . |
| 4,256,364 | 3/1981 | Minoura et al. . |
| 4,369,361 | 1/1983 | Swartz et al. . |
| 4,387,297 | 6/1983 | Swartz et al. . |
| 4,409,470 | 10/1983 | Shepard et al. . |
| 4,496,831 | 1/1985 | Swartz et al. . |
| 4,593,186 | 6/1986 | Swartz et al. . |
| 4,632,501 | 12/1986 | Glynn . |
| 4,705,365 | 11/1987 | Wakita et al. . |
| 4,732,440 | 3/1988 | Gadhok . |
| 4,808,804 | 2/1989 | Krichever et al. . |
| 4,816,660 | 3/1989 | Swartz et al. . |
| 4,816,661 | 3/1989 | Krichever et al. . |
| 4,871,904 | 10/1989 | Metlitsky et al. . |
| 4,902,083 | 2/1990 | Wells . |
| 4,919,500 | 4/1990 | Paulsen . |
| 4,974,918 | 12/1990 | Delache et al. . |
| 5,168,149 | 12/1992 | Dvorkis et al. ................ 235/472 |
| 5,245,463 | 9/1993 | Goto ............................. 359/224 X |

FOREIGN PATENT DOCUMENTS 4-368907  12/1992  Japan ................................ 359/224

OTHER PUBLICATIONS

Reich, "The Use of Electro-Mechanical Mirror Scanning Devices," SPIE vol. 84 Laser Scanning Components & Techniques, pp. 47–55 (1976).

Primary Examiner—Donald T. Hajec
Assistant Examiner—Jeffrey R. Filipek
Attorney, Agent, or Firm—Kirschstein, et al.

[57] ABSTRACT

A scanning arrangement contained in a scanning device which is operative for repetitively scanning indicia having parts of different light reflectivity; for instance, such as a bar code symbol through the intermediary of a scanning light or laser beam projected by the scanning arrangement in the form of a scan line which traverses the indicia at high scanning speeds in order to enable the reading of the information contained therein. The scan line is normally subject to a curvature which, at frequent times, may adversely influence the quality of the scanning operation or even lead to an incomplete reading of the indicia so as to create an erroneous information output, is imparted a curvature correction which will produce a linear scanning line at the indicia being scanned and read thereby, and thereby optimize the efficiency of the operation of the scanning element so as to enable the obtention of a high quality and rapidly implemented accurate scanning result from the information contained in the scanned indicia.

16 Claims, 7 Drawing Sheets

ARRANGEMENT FOR COMPENSATING FOR SCAN LINE CURVATURE

This application is a continuation in part of application Ser. No. 08/111,525 filed Aug. 25, 1993, abandoned, which is a CIP of Ser. No. 07/812,922 filed Dec. 24, 1991, abandoned, which is a CIP of Ser. No. 07/520,464 filed May 8, 1990 U.S. Pat. No. 5,168,149 which is a CIP of Ser. No. 07/428,770 filed Oct. 30, 1989 U.S. Pat. No. 5,099,110.

BACKGROUND OF THE INVENTION

1. Field of the Invention

The present invention generally relates to a scanning arrangement contained in a scanning device which is operative for repetitively scanning indicia having parts of different light reflectivity; for instance, such as a bar code symbol, through the intermediary of a scanning light or laser beam projected by the scanning arrangement in the form of a line and swept across the indicia at high scanning speeds in order to facilitate the reading of the information contained therein.

In greater particularity, the invention is specifically directed to the provision of a scanning arrangement and method of utilizing the arrangement, in which the scan line for the scanning and reading of the indicia, such scanning line heretofore normally being subject to a curvature which, at times, may adversely influence the quality of the scanning operation or even lead to an incomplete reading of the indicia so as to create an erroneous information output, is inventively imparted a curvature correction which will generate a linear or straight scan line sweeping the indicia. This curvature correction of the scan line optimizes the efficiency in the operation of the scanning element so as to enable the obtention of accurate, complete and high quality data from the information contained in the indicia which is being scanned and read by the scanning device.

The utilization of laser scanning devices for the scanning or reading of information provided on a target; such as a package or sale item, is well known in this particular technology and has found wide acceptance in commerce. In this connection, various types of laser scanning devices incorporate scanning heads which house optical reading systems, such as bar code readers, for the reading of information or bar code symbols on targets which are scanned by a laser beam projected from the bar code reader. In general, such laser scanning devices; especially those in the type of bar code readers, are widely employed in industry, such as manufacturing, shipping, and in retail commerce and; for example, may be permanently incorporated in the structures of check-out counters of supermarkets, whereby the items of merchandise having the bar code symbols imprinted thereon or applied thereto are passed over a fixed bar code reader located beneath the counter surface so as to provide a record for the merchant of the merchandise being purchased by a consumer, and concurrently a readout (and possibly a printed record) for the consumer.

Alternatively, the bar code reader or laser scanning device may also be constituted of an optical scanner unit which is fixedly mounted on a stand extending above a support platform or countertop on which the merchandise may be arranged; or in many instances of utilization, pursuant to a preferred embodiment of the invention, may be in the form of a miniature, lightweight and gun-shaped device having a pistol grip, and which the actived device is normally passed over the bar code symbol which is imprinted on a sale item or target at some short distance therefrom so as to enable scanning of the information provided by the bar code symbols.

2. Discussion of the Prior Art

Various optical readers and optical scanning systems have been developed heretofore for reading bar code symbols appearing on a label or on the surface of an article. The bar code symbol itself is a coded pattern of indicia comprises of a series of bars of various widths spaced apart from one another to bound spaces of various widths, the bars and spaces having different light-reflecting characteristics. The readers and scanning systems electro-optically transform the graphic indicia into electrical signals, which are decoded into alphanumerical characters that are intended to be descriptive of the article or some characteristic thereof. Such characters are typically represented in digital form and utilized as an input to a data processing system for applications, in point-of-sale processing, inventory control, and the like. Scanning systems of this general type have been disclosed, for example, in U.S. Pat. Nos. 4,251,798; 4,369,361; 4,387,297; 4,409,470; 4,760,248; and 4,896,026, all of which have been assigned to the same assignee as the instant application.

As disclosed in some of the above patents, one embodiment of such a scanning system resides, inter alia, in a hand-held, portable laser scanning head supported by a user, which is configured to allow the user to aim the head, and more particularly, the light beam or laser beam projected therefrom, at a target and a symbol which is to be read.

The light source in a laser scanner is typically a gas laser or semiconductor laser. The use of semiconductor devices, such as a laser diode, as the light source in scanning systems is especially desirable because of their small size, low cost and low power requirements. The laser beam is optically modified, typically by a lens, to form a beam spot of a certain size at the target distance. It is preferred that the beam spot size at the target distance be approximately the same as the minimum width between regions of different light reflectivity, i.e., the bars and spaces of the symbol.

Bar code symbols are formed from bars or elements that are typically rectangular in shape with a variety of possible widths. The specific arrangement of elements defines the character represented according to a set of rules and definitions specified by the code or "symbology" used. The relative size of the bars and spaces is determined by the type of coding used, as is the actual size of the bars and spaces. The number of characters per inch represented by the bar code symbol is referred to as the density of the symbol. To encode a desired sequence of characters, a collection of element arrangements are concatenated together to form the complete bar code symbol, with each character of the message being represented by its own corresponding group of elements. In some symbologies a unique "start" and "stop" character is used to indicate where the bar code begins and ends. A number of different bar code symbologies exist. These symbologies include UPC/EAN, Code 39, Code 128, Codabar, and Interleaved 2 of 5.

For purpose of discussion, characters recognized and defined by a symbology shall be referred to as legitimate characters, while characters not recognized and defined by that symbology are referred to as illegitimate characters. Thus, an arrangement of elements not decodable by a given symbology corresponds to an illegitimate character(s) for that symbology.

In order to increase the amount of data that can be represented or stored on a given amount of surface area, several new bar code symbologies have recently been developed. One of these new code standards, Code 49, introduces a "two-dimensional" concept by stacking rows of characters vertically instead of extending the bars horizontally. That is, there are several rows of bar and space patterns, instead of only one row. The structure of Code 49 is described in U.S. Pat. No. 4,794,239, which is hereby incorporated by reference.

A one-dimensional single-line scan, as ordinarily provided by hand-held readers, has disadvantages in reading these two dimensional bar codes; that is, the reader must be aimed at each row, individually. Likewise, the multiple-scan-line readers produce a number of scan lines at an angle to one another so these are not suitable for recognizing a Code 49 type of two-dimensional symbols.

In the scanning systems known in the art, the light beam is directed by a lens or similar optical components along a light path toward a target that includes a bar code symbol on the surface. The scanning functions by repetitively scanning the light beam in a line or series of lines across the symbol. The scanning component may incorporate a drive or scanning motor adopted to either sweep the beam spot across the symbol and trace a scan line across and past the symbol in a high-speed repetitive mode, or scan the field of view of the scanner, or do both.

Scanning systems also normally include a sensor or photodetector which functions to detect light reflected from the symbol. The photodetector is therefore positioned in the scanner or in an optical path in which it has a field of view which extends across and slightly past the symbol. A portion of the reflected light which is reflected off the symbol is detected and converted into an electrical signal, and electronic circuitry or software decodes the electrical signal into a digital representation of the data represented by the symbol that has been scanned. For example, the analog electrical signal from the photodetector may typically be converted into a pulse width modulated digital signal, with the widths corresponding to the physical widths of the bars and spaces. Such a signal is then decoded according to the specific symbology into a binary representation of the data encoded in the symbol, and to the alphanumeric characters so represented.

The decoding process in known scanning systems usually work in the following way. The decoder receives the pulse width modulated digital signal from the scanner, and an algorithm implemented in software attempts to decode the scan. If the start and stop characters and the characters between them in the scan were decoded successfully and completely, the decoding process terminates and an indicator of a successful read (such as a green light and/or an audible beep) is provided to the user. Otherwise, the decoder receives the next scan, performs another decode attempt on that scan, and so on, until a completely decoded scan is achieved or no more scans are available.

Such a signal is then decoded according to the specific symbology into a binary representation of the data encoded in the symbol, and to the alphanumeric characters so represented.

Laser scanners are not the only type of optical instrument capable of reading bar code symbols. Another type of bar code reader is one which incorporates detectors based upon charge coupled device (CCD) technology. In such readers, the size of the detector is larger than or substantially the same as the symbol which is to be read. The entire symbol is flooded with light from the reader, and each CCD cell is sequentially read out to determine the presence of a bar or a space. Such readers are lightweight and easy to use, but require substantially direct contact or placement of the reader on the symbol to enable the symbol to properly read. Such physical contact of the reader with the symbol is a preferred mode of operation for some applications, or as a matter of personal preference by the user.

In effect, the invention is directed towards the provision of a scanner which incorporates a rapidly oscillated scan element or mirror which is supported and dimensioned so as to be adapted, if necessary, for high frequency scanning operation, with a large-sized scan element or mirror being suitably mounted on a preferably, but not necessarily U-shaped resilient element enabling the rotation of the scan element or mirror about a fast axis of rotation and with the U-shaped spring member supporting the scan element being fastened to a spring plate which is imparted oscillation at a considerably lower frequency. In essence, the frequencies imparted to the scan element or mirror, as mentioned hereinbefore, through the projection of a suitable light or laser beam against a target bearing indicia containing information to be read, produce a scan line which rapidly sweeps over the indicia so as to enable the reading and obtention of information contained therein.

Ordinarily, due to the angles involved in projecting the light or laser beam and the oscillations of the scan element, the scan line sweeping across the indicia is imparted a certain inherent curvature which, particularly in the presence of having to scan densely arranged imprinted information on a symbol, such as may be contained in a PDF (portable data file) system which is scanned by a 2D-scanning device, this may cause some of the information contained in the indicia to be missed by the scan line during its sweeping oscillations across the surface thereof, and possibly resulting in an incomplete information retrieval so as to adversely influence the quality of the scanning operation of the device.

SUMMARY OF THE INVENTION

The present invention overcomes or at least ameliorates the foregoing disadvantages and drawbacks encountered in the scanning technology by imparting a curvature correction or straightening effect to the ordinarily curvilinear scan line so as to resultingly produce an essentially linear or straight scan line which will enable the complete and accurate reading of information contained in an indicia, such as a bar code symbol. This advantageous improvement in the scanning technology is accomplished without the need for having to incorporate an additional structural or operational component into the scanning arrangement but, to the contrary, is attained through modifications to existing scanning components which, in a simple, economical and surprising manner, eliminate the curvature from the scan line projected across the scanned indicia.

Hereby, in a first instance, the presently normally encountered curvature of the scan line is inventively eliminated in that the scan element or mirror has its axis of symmetry offset relative to the U-shaped flexure on which it is mounted while the electromagnetically actuated arrangement imparting scanning oscillations to the scan mirror through electrical energization thereof is positioned in the axis of symmetry of the flexure, thereby providing a relative offset or eccentricity between the actuating or read-start arrangement for the scan element or mirror, imparting a twisting motion to the flexure and resultingly the scan mirror which compensates for and eliminates the curvature of the scan line sweeping the indicia.

Alternatively, pursuant to a modified embodiment, when the scan element or mirror is mounted with its longitudinal or axis of symmetry oriented on the centerline of the flexure, a similar scan line curvature compensation or straightening effect can be achieved by providing an offset to the magnet of the actuating arrangement relative to the axis of symmetry of the scan element and flexure. This again, will provide for a straightening of the scan line so as to clearly improve upon the curved scan lines obtained in current scanning devices.

Although the foregoing produces the desired straightening of the scan line, due to the novel orientation of the scanning components with respect to each other within the scanning device, frequently due to the optics in the device, such straightened scan lines are projected against the indicia at an oblique or skew angle relative to the latter, thereby requiring either more extensive scanning sweeps, which of necessity increases the stresses imposed on the components of the scanning device; or the sweep of the scan line across the indicia may conceivably fail to encompass the ends or remote corners of the indicia, such as a bar code symbol, thereby resulting in the obtention of incomplete data with respect to the information contained therein.

Thus, pursuant to a further preferred embodiment of the invention, the scan element or mirror is mounted through the intermediary of a suitable holder on the flexure so as to have its axis of symmetry completely in symmetry therewith, whereas the components consisting of the scan element holder and flexure are mounted so as to be offset with respect to the back or plate-shaped flexure and the electromagnetic actuating system. Consequently, the eccentric mounting of both the flexure and the scan element or mirror located symmetrically thereon relative to the other scanning arrangement elements produce the desired straightening of the scan line while concurrently inhibiting the scan line from being projected at a skew angle onto the symbol being scanned and read by the scanning device.

Accordingly, it is an object of the present invention to provide a scanning arrangement incorporating a scan element, such as a scan mirror, which is mounted on a flexure such that an electromagnetic actuating device for the imparting of oscillations to the scan element is located eccentrically or offset relative to the axis of symmetry of the scan element, and thereby imposes a straightening effect on a curvilinear scan line scanning indicia.

It is another object to provide a scanning arrangement of the type described in which the scan element or mirror is mounted with its axis of symmetry offset relative to the central axis of a flexure on which it is mounted to thereby generate a secondary oscillatory torsional motion component tending to counteract and eliminate the curvature of a scan line being projected onto an indicia.

A further object of the present invention is to provide a scanning arrangement of the type described, in which the scan element or mirror which is mounted on a flexure by means of a holder so as to have its axis of symmetry coincide with the longitudinal centerline of the flexure, with the arrangement consisting of the scan element, the holder and the flexure on which the former are mounted being asymmetrical or offset relative to a back plate constituting a second flexure fastening the aforementioned elements eccentrically relative to an electromagnetic actuating device for the scan element, to resultingly impart a straightening effect on a generally curvilinear scan line.

A still further object of the invention resides in the provision of a method for the straightening of a scan line projected against indicia through the intermediary of a scanning arrangement as described and elucidated herein.

BRIEF DESCRIPTION OF THE DRAWINGS

The foregoing and other objects of the present invention may now be more readily ascertained from the following detailed description of various exemplary embodiments of the scanning arrangement, taken in conjunction with the accompanying drawings; in which.

DETAILED DESCRIPTION

Figure 1:
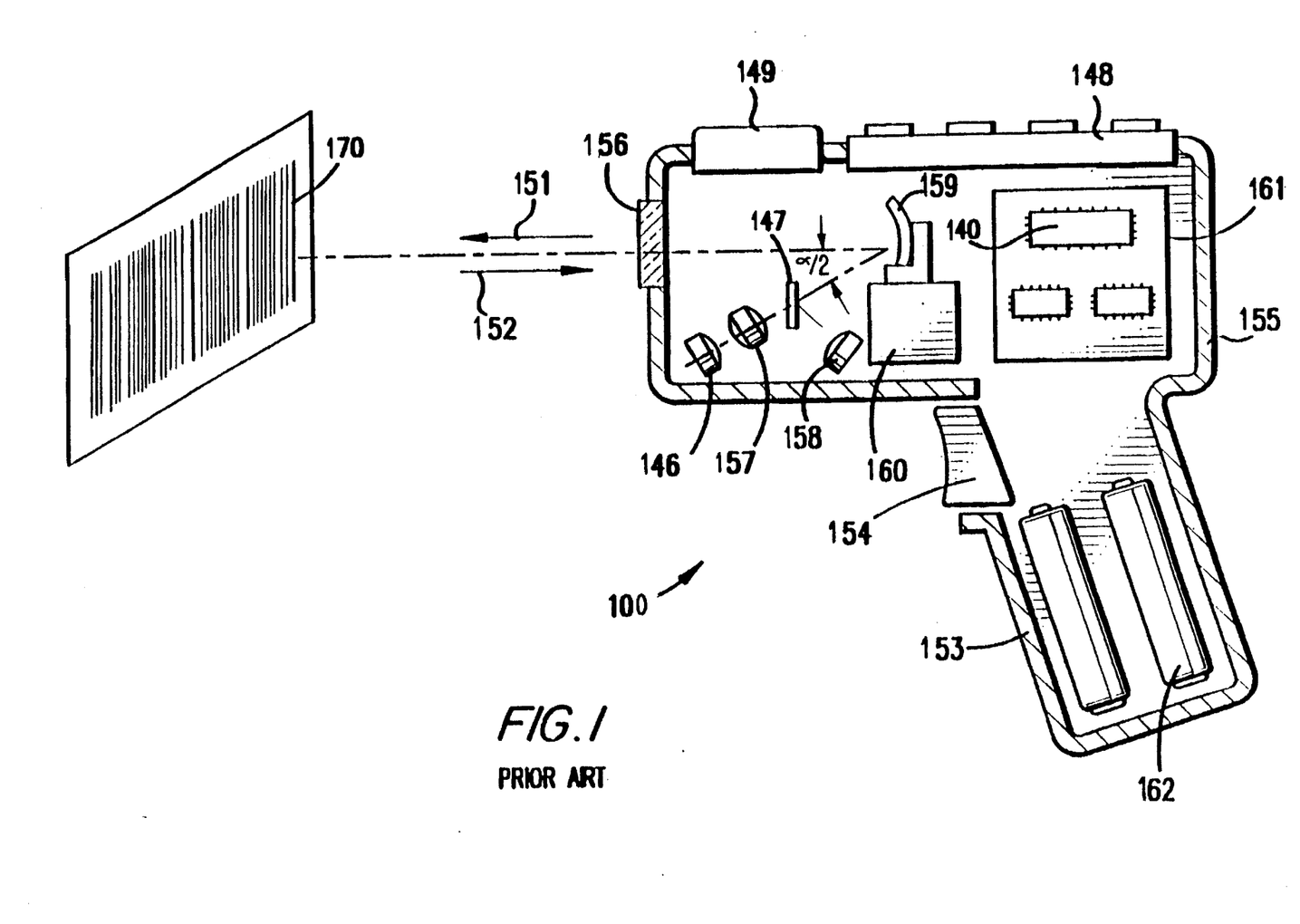
FIG. 1 illustrates a longitudinal sectional view through an exemplary embodiment of a laser scanning device, wherein the device is in the shape of a hand-held gun-shaped component.

Referring in more specific detail to the drawings, as diagrammatically illustrated in FIG. 1, pursuant to a typical exemplary embodiment, a laser scanning device may be a bar code reader unit 100 in a hand-held gun-shaped configuration, although obviously other kinds of configurations of scanners readily lend themselves to the invention, having a pistol-grip type of handle 153 and in which a movable trigger 154 is employed to allow the user to activate the light beam 151 and detector circuitry when pointed at the symbol to be read, thereby saving battery life if the unit is self-powered. A lightweight plastic housing 155 contains the laser light source, the detector 158, the optics and signal processing circuitry, and the CPU 140 as well as power source or battery 162. A light-transmissive window 156 in the front end of the housing 155 allows the outgoing light beam 151 to exit and the incoming reflected light 152 to enter. The reader 100 is designed to be aimed at a bar code symbol by the user from a position in which the reader 100 is spaced from the symbol, i.e., not touching the symbol or moving across the symbol. Typically, this type of hand-held bar code reader is specified to operate in the range of from contact with the symbol to distances of perhaps several inches or even further therefrom.

As further depicted in FIG. 1, a suitable lens 157 (or multiple lens system) may be used to focus the scanned beam onto the bar code symbol at an appropriate reference plane. A light source 146, such as a semiconductor laser diode, is positioned to introduce a light beam into the axis of the lens 157, and the beam passes through a partially-silvered mirror 147 and other lenses or beam-shaping structure as needed, along with an oscillating mirror or scanning element 159 which is attached to a scanning motor 160 activated when the trigger 154 is pulled. If the light produced by the source 146 is not visible, an aiming light, if needed, produces a visible-light spot which may be fixed, or scanned just like the laser beam; the user employs this visible light to aim the reader unit at the symbol before pulling the trigger 154.

Figure 5:
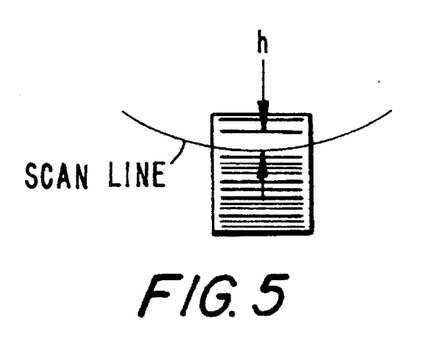
FIG. 5 illustrates a bar code symbol being scanned with a scan line pursuant to the current state-of-the-art.

In connection with the foregoing, the light beam 151 produces a scanning line which traverses the symbol or bar code symbol in a reciprocatory motion so as to elicit the information contained therein. Ordinarily, although such a scanning line formed by the light beam 151 is intended to be linear in configuration, quite frequently, the line is imparted a predetermined degree of curvature, as is set forth hereinbelow in further detail in connection with FIG. 5 of the drawings. Consequently, at times, even with repeated traversal or sweeping of the symbol by the curvilinear scan line, it is possible that segments of the information contained in the symbol may not be scanned by the light beam 151, thus leading to either an incomplete or erroneous data input to the scanning device. The extent of the curvature defined to the partial radial height "h" in FIG. 5 at times depends upon the angular deflection of the projected light beam within the scanning device, as identified by the angle θ in FIG. 2.

Hereby, commonly employed scanning arrangements which are incorporated into scanning devices of the type described hereinabove, as shown in FIG. 1, are elucidated in FIGS. 2 through 4 of the drawings.

Figure 2:
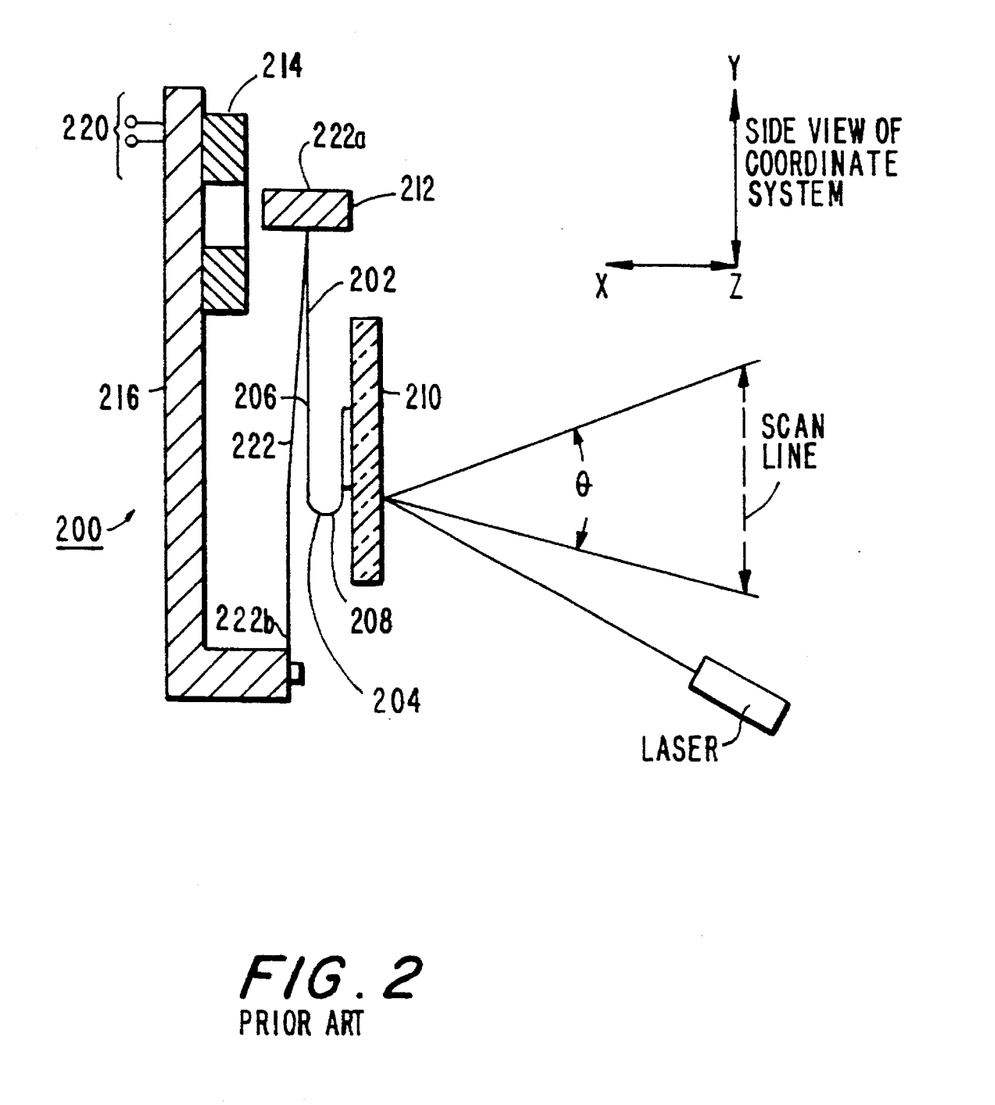
FIG. 2 illustrates a cross-sectional view through a typical scanning arrangement which is employable with the present invention.

As is illustrated in FIG. 2 of the drawings, which represents a typical scanning arrangement 200 for the implementation of a one-dimensional or one-axis scan pattern, a holder 202 incorporates a U-shaped spring 204 having a pair of arms 206 and 208. A scan element 210; for example, such as a light reflector or mirror, is fixedly mounted at the free end of the arm 208 by means of the holder 202, while a permanent magnet 212 is mounted at the opposite free end of arm 206. An electromagnetic coil 214 is fixedly mounted on an upright support member 216, the latter of which is secured to a base 218. Electrical input leads 220 supply an energizing signal to the electromagnetic coil 214. The arm 206 and the permanent magnet 212 are secured to a generally planar spring member 222 at one end 222a thereof, and which has its other end 222b secured to the base 218. The planar spring 222 may be made of any suitable flexible material, such as a leaf spring, a flexible metal foil, or a flat bar. The holder comprising the U-shaped spring structure 204, 206, 208 may also be constituted from any suitable metallic material possessing resilient or flexibility properties; preferably a material such as a beryllium-copper alloy. The mass of the mirror 210, which may be equal to the mass of the permanent magnet 212, under certain instances may be much higher than the equivalent mass of the U-shaped spring 204.

Figure 12:
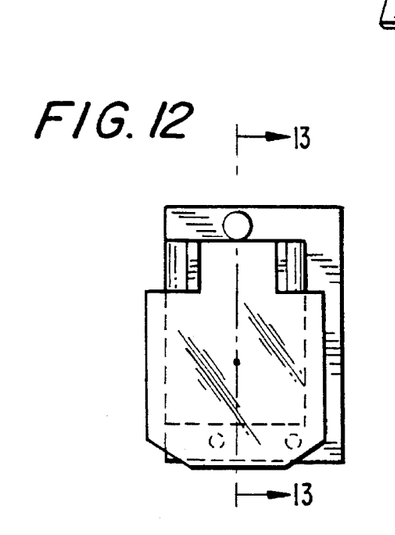
FIG. 12 illustrates a front view of the scanning components of FIG. 11.
Figure 13:
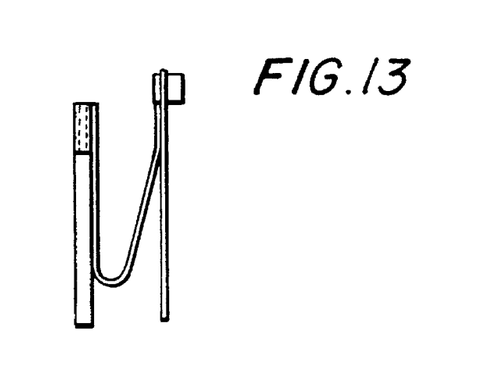
FIG. 13 is a sectional view taken along line 13—13 in FIG. 12.

Pursuant to a more recent development with regard to scanning arrangements of the above-mentioned type, in order to be able to support larger-sized and heavier scan elements or mirrors on the flexure, the latter of which is generally represented by the U-shaped spring, it has become advantageous to form the spring with arms of unequal length and to provide a holder for the attachment of the scan element such that the center of mass for the scan element essentially coincides with the axis of rotation thereof when fastened to the essentially shorter arm of the U-shaped spring forming the flexure which oscillates at a high frequency. This advancement in the formation of the scanning arrangement is provided for by a resonant asymmetric scan element whereby the asymmetrically dimensioned U-shaped spring provides a higher durability against metal fatigue and cracking due to the resultant reduction in laboratory stresses. Hereby, reference may be made to the embodiment of the scanning arrangement as shown in FIGS. 3 and 4 of the drawings, and also with regard to a holder of the type for the scan element as is shown in FIGS. 11 through 13 of the drawings.

Figure 3:
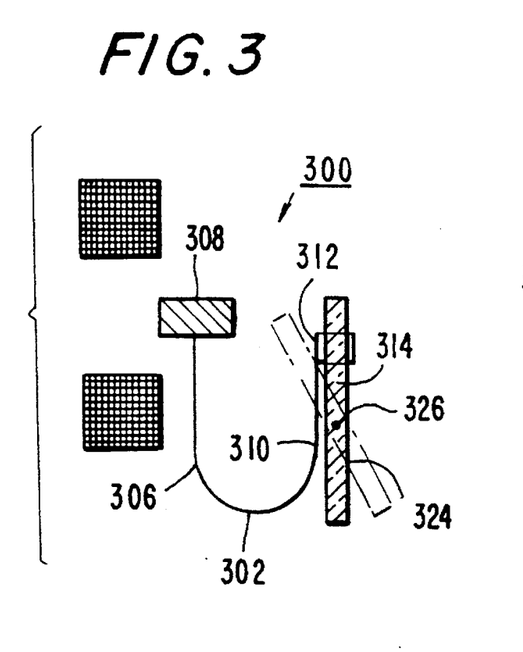
FIG. 3 illustrates a cross-sectional view through a scanning arrangement similar to FIG. 2 showing the holder for mounting a scan element or mirror positioned to produce an essentially resonant asymmetric scan element.
Figure 4:
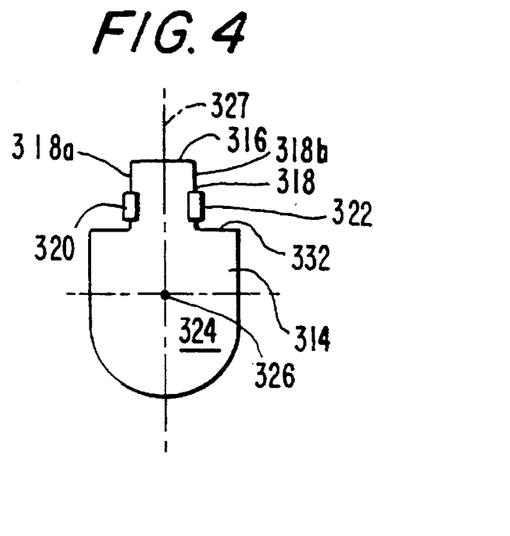
FIG. 4 illustrates the scanning arrangement of FIG. 3 shown in a front view.

Basically, having specific reference to FIGS. 3 and 4, the scanning arrangement 300 comprises a resonance asymmetric scan element including a flexure consisting of a U-shaped spring 302 which has a first arm 306 onto which there is fastened a magnet 308, whereas a second arm 310 of the U-shaped spring or flexure 302 which is shorter than the arm 306 has its upper or free end provided with a flexible holder structure 312, preferably constituted from a beryllium-copper alloy, as described in more specific detail hereinbelow, for clampingly engaging and mounting a scan element or mirror 314 which is constructed according to the present invention. Hereby, the mirror has a reduced cross-sectional width at the upper end 316 thereof so as to form a generally rectangular neck portion 318, the opposite side edges 318a, 318b of which are clamped by inwardly folded clip-like members or gripping arms 320 and 322 formed at the opposite sides of the holder structure 312 on the upper end of the arm 310. Below the neck portion 318 of the mirror 314, which is mounted on the spring arm 310 by being engaged and between the gripping arms 320, 322, the mirror widens considerably both sideways and downwardly so as to provide a large surface 324 for scanning purposes, through which there extends the fast or high-frequency axis of rotation 326 which is perpendicular to an axis of symmetry 327 for the mirror, holder and U-shaped spring. This mounting of the mirror 314 at its upper neck portion 318 to the flexure or spring 304 positions the center of mass of the mirror 314 so as to essentially coincide with the fast axis of rotation 326 (and also the axis of symmetry 327) and thereby reduces the distance between the mirror center of mass and the axis of rotation to practically zero.

Figure 11:
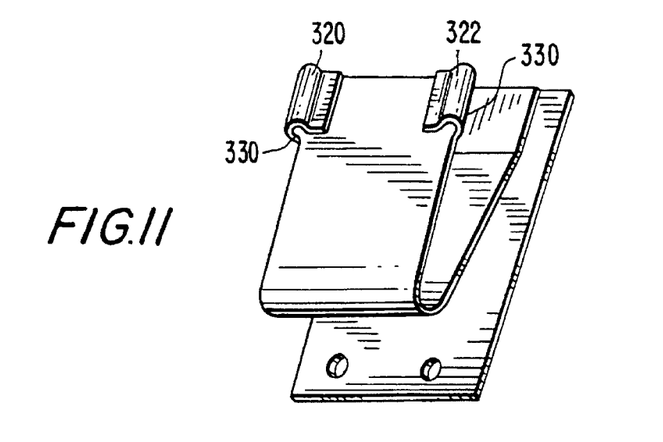
FIG. 11 illustrates a perspective front view of a portion of a scanning arrangement with a holder for a scan mirror in a configuration representing a third embodiment of the invention, with the scan mirror omitted therefrom for purposes of clarity.

The upper end of the spring arm 310 with the gripping arms 320, 322 on the holder structure 312, as may be more closely ascertained from FIG. 11 of the drawings, discloses that the flexible gripping arms 320 and 322 may each be provided at their lower ends with ear lobes 330 or recesses so as to render them more resilient or flexible towards those ends from which the mirror neck portion 318 is inserted into surface contact with the holder structure 312 of the flexure or U-shaped spring 304. Thus, as shown in FIG. 4 of the drawings, upon the mirror 314 being slid beneath the gripping arms 320 and 322 until the upper wider edge of the shoulders 332 contact the lower edges of ear lobes 330 to enable the fixed yet flexible mounting thereof in the holder structure.

Figure 14:
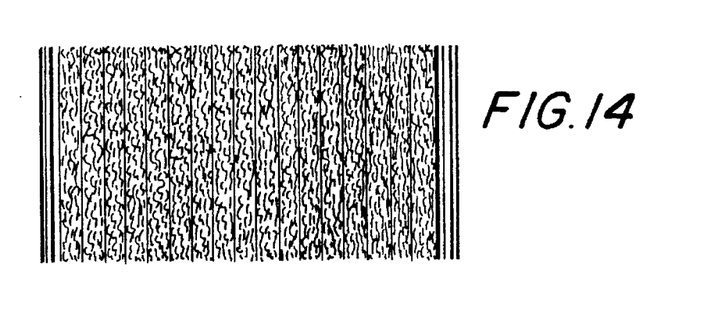
FIG. 14 illustrates a symbol incorporating a portable data file (PDF) adapted to be scanned by the inventively curvature-corrected or straightened scan line.

In the foregoing described embodiments of the scanning arrangement, the axis of symmetry 327 is normally considered as extending through the scanning element and flexure essentially in coincidence with the positioning of the magnet 212 or 308. Although the foregoing scanning arrangements normally, or at least frequently, generate curvilinear scan lines, having reference to FIG. 5 of the drawings, which are adequate to be able to scan and read the entire information contained in a symbol, such as a bar code symbol due to a multiplicity of scanning sweeps implemented over the symbol or indicia during any particular scanning and reading sequence, there are occasions in which such curvilinear scan lines may possibly fail to cover the entire symbol on a target, particularly within the region of the concavity of the curvilinear line or possibly in the convex regions defined by the outer extremities thereof adjacent the edges of the symbol, thereby providing only incomplete or possibly even erroneous data regarding information which is provided in the entire symbol or bar code. This is of particular significance when a considerable amount of closely confined and densely recorded information or data is present within a particular symbol, such as in disclosed in FIG. 14 of the drawings, representative of a considerable amount of information provided within an extremely small area, commonly identified in the technology as a portable data file (PDF) system. Hereby, it is conceivable that the curvature inherent to the scan line may potentially cause small portions of the center region towards one edge of the symbol and towards the opposite edge to miss information-containing regions at the outer extremities of the symbol. Consequently, it is imperative in order to be able to obtain accurate data regarding information contained in the symbol that the scan line during its sweeps traverses and reads all of the information contained in the symbol at a high degree of reliability and accuracy. Thus, it becomes extremely important that the scan line be essentially linear in nature so as to in its sweeps across the surface of the symbol to be able to scan all of the information contained therein.

The foregoing is achieved in a novel and surprisingly simple manner through the provision of an eccentricity or offset between the axis of symmetry of at least the scan element and the electromagnetic actuating device or magnet which imparts the oscillations to the flexure and scan element so as to, resultingly, generate a secondary movement or oscillation about the y (as shown in FIG. 2) which will impart a motion component to the scan element to compensate for the curvature of a scan line and result in a linear or straight scan line at the symbol.

Figure 7:
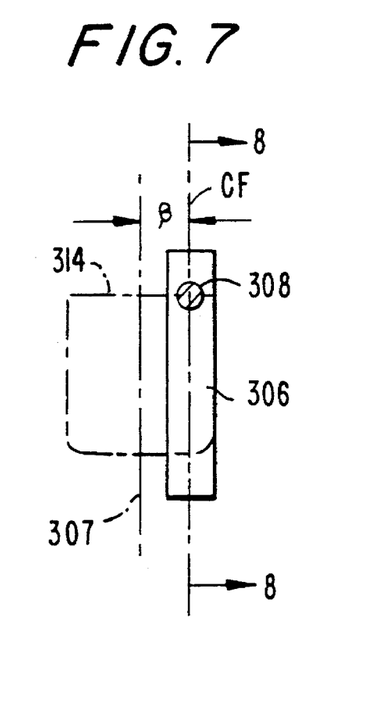
FIG. 7 illustrates a rear view of a first embodiment of a portion of a scanning arrangement for straightening a scan line pursuant to the invention.
Figure 8:
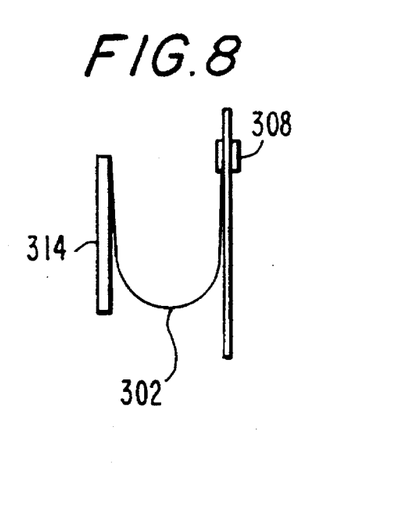
FIG. 8 illustrates a sectional view taken along line 8—8 in FIG. 7.

Thus, in one embodiment of the U-shaped flexure and scan element, as shown in FIGS. 7 and 8 wherein the reference numerals of the components are identical those set forth with regard to the embodiment of the scanning arrangement of FIGS. 3 and 4, although this structure can also be applied to the embodiment of FIG. 2, the scan element 314 is configured such that the axis of symmetry 327 thereof is laterally offset from the longitudinal centerline CF of the flexure 302 for the arm 310 on which it is mounted, so that the axis of symmetry 327 of the scan element 314 is at a displacement B relative to the magnet 308, the latter of which is in alignment with the longitudinal center line CF for the flexure 302. This will produce a twisting moment in addition to the oscillating frequencies imposed on the scan element or mirror 314 and result in a compensation for the curvature of the scan line, thereby straightening the latter during its sweeps across the indicia.

Figure 9:
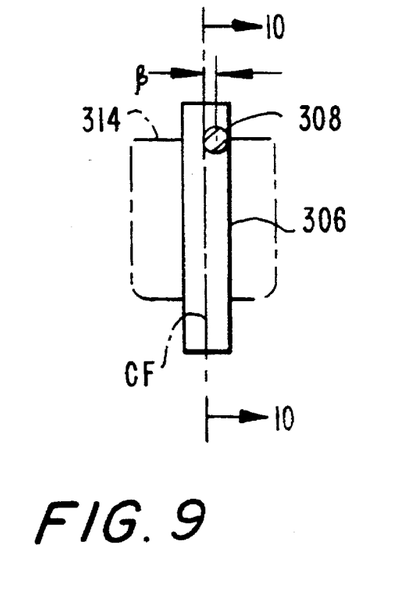
FIG. 9 illustrates a view similar to that in FIG. 7 of a second embodiment of a portion of a scanning arrangement pursuant to the invention.
Figure 10:
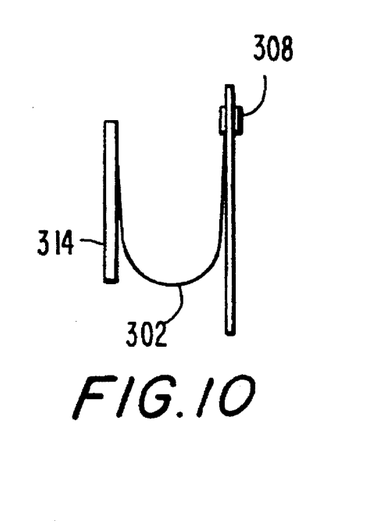
FIG. 10 illustrates a sectional view taken along line 10—10 in FIG. 9.

Pursuant to an alternative embodiment, as set forth in FIGS. 9 and 10 of the drawings, the scan element or mirror 314 has its axis of symmetry coinciding with that of the flexure, as in the instance of the scanning structures of FIGS. 2 through 4; however, in this case, the magnet or actuating element 212 or 308 which is attached to the back plate or flat spring member 222 or 406 is laterally offset relative to the common axis of symmetry for the scan element 210 or 314 and flexure 208 or 304 thereby creating a torsional movement about the axis of symmetry tending to impart a further oscillation about the y axis compensating for the curvature of the scan line and straightening the scan line during its sweeps across the symbol.

Figure 6:
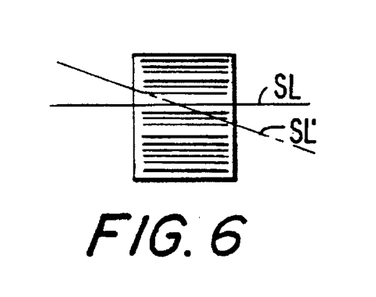
FIG. 6 illustrates the bar code symbol of FIG. 5 with the curvature-corrected or straightened scan line shown in two angular scanning orientations thereof.

Although this produces an essentially straight scan line SL, as shown in FIG. 6, the structures as set forth herein with the particular displacements between the axis of symmetry and magnet apparently imparts a skew angle to the scan line as shown by the phantom-line representation SL' thereof, possibly caused by the angular positioning α of the optics in the scanning device, which, in turn may result in an incomplete scanning of all of the information contained in the symbol.

In order to compensate for the foregoing angular orientation of the scan line, and to more readily ensure that the scan line will be properly oriented relative to the symbol or bar code, in the embodiment of the flexure 302 and holder 312 for the scan element or mirror 314, particular as shown in FIGS. 11 through 13, the U-shaped flexure which incorporates the holder for mounting the scan element or mirror 314 is laterally displaced so as to be offset from the axis of symmetry for the composite flexure and scan element system. Thus, the relatively wide backplate, which forms the flat spring member for the low frequency oscillation of the scan element or mirror remains centered in its fastened position in the scanning arrangement in conjunction with the centered magnet 212 or 308 or actuating device imparting the electromagnetic energy to the oscillations thereto, whereas the entire U-shaped spring forming the high-frequency flexure and the scan element or mirror symmetrically mounted thereon are asymmetrical relative to the back plate, the magnet and the remaining components of the scanning device thereby providing a torsional moment to the entire unit about the y axis due to the inherent offset or eccentricity. This not only produces a straightening of the scan line but, concurrently, assures that the line will remain properly oriented relative to a symbol being scanned and read.

The previously discussed first embodiment of the present invention corrects for curvature along a scan line in the Y direction by creating a force on the scan mirror to initiate movement in the X direction. This movement is generally manifest as a flutter, in the range of approximately 250 Hz for example. Thus, the curvature due to sagging or misaligned springs, as well as inherent curvature, can be corrected for a scan line along the Y axis.

Figure 16:
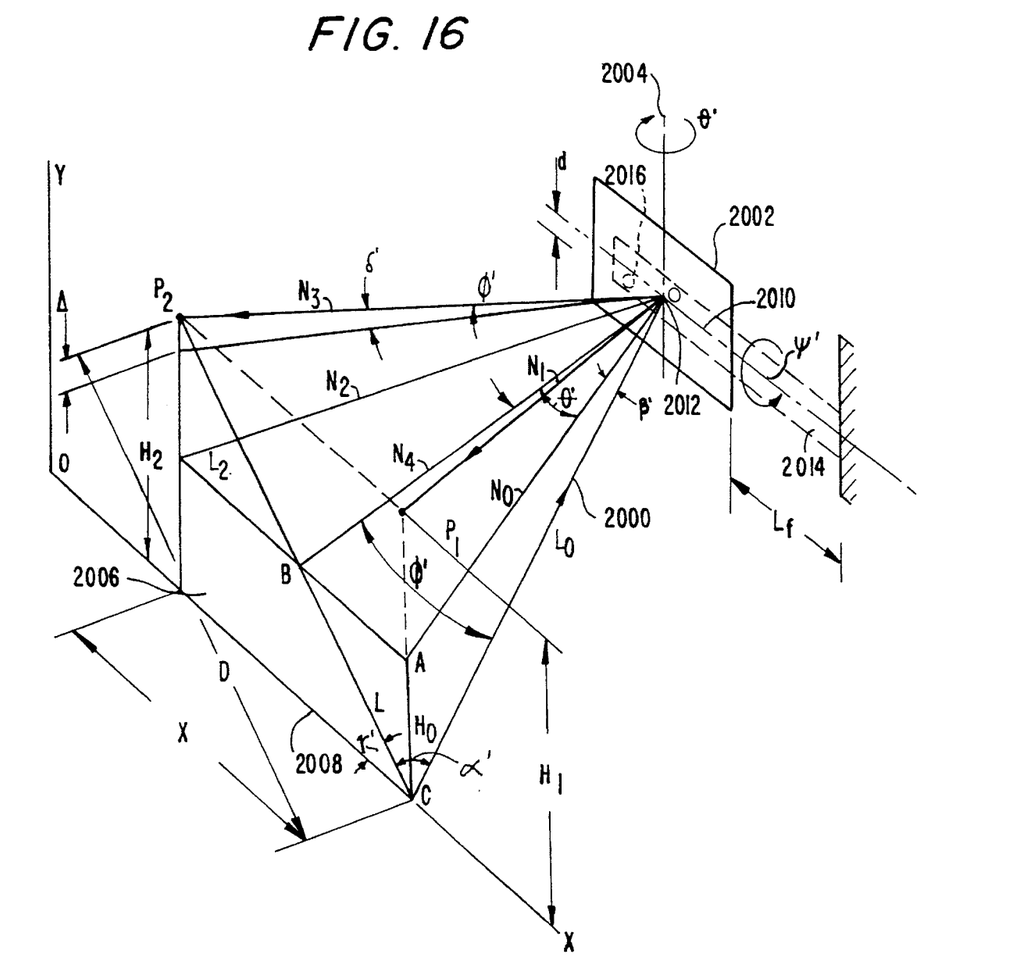
FIG. 16 illustrates the computation of the actuator offset to straighten scan curvature in accordance with the present invention.

The offset discussed above can be computed as described in detail below. As shown in FIG. 16, an optical beam 2000, for example a laser light beam, is directed along line $L_o$ and reflected off a mirror or other reflective optical component 2002. With the mirror in a stationary position prior to beginning oscillatory rotation about the scan rotation axis 2004, the laser beam 2000 is reflected off the mirror 2002 along the line $N_1$. As shown, the emitted beam 2000 is directed along a line Lo which is at an angle φ from line $N_4$ normal to the mirror 2002 prior to oscillatory movement thereof. The reflected light beam contacts a plane 2006, which is normal to the line $N_4$ and within the working range of the scan device, at a point $P_1$. Preferably, for purposes of offset determination, the plane 2006 is located at the maximum working distance of the scan device for the type of indicia which is to be read.

The mirror 2002 rotates through an angle $\theta'$ about axis 2004 to scan the reflected light beam across the plane 2006. At the maximum rotation, the reflected beam contacts the plane 2006 at point $P_2$. Due to scan line curvature, point $P_2$ and point $P_1$ will not be at the same distance from reference line 2008 in plane 2006 which is parallel to line 2010. Line 2010 in turn is perpendicular to scan rotation axis 2004 of the mirror 2002, and aligned with the point 2012 at which the emitted light beam 2000 contacts the mirror 2002. Line 2010 is aligned with the centerline of flex support member 2014, as shown in FIG. 16. The difference $\Delta$ in the heights of point $P_2$ and point $P_1$ will correspond to the angle $\phi'$ between the emitted laser light beam 2000 and the line $N_4$ normal to the mirror 2002 in a stationary start position, i.e., non-rotated position. The correction angle $\delta$ is the angle by which the mirror 2002 must be rotated about line 2010 to reduce or eliminate the curvature in the scan line. Offsetting the actuator 2016, e.g., a coil and magnet assembly, from line 2010 provides a correcting rotation to the mirror 2002 about line 2010 by developing a bending or torsional moment in the flex support member That is, the support member which is vibrated by the actuator in one or more directions to place the optical component in oscillatory motion, thereby causing the reflected light beam to form a scan line across the indicia, is subjected to moment forces caused by the actuator offset and in response rotates the mirror about an axis which is normal to the scan rotation axis. Normally, in optical scanners, the ratio of the resonance frequencies in the scan direction and the correction direction of the flex support structure will be between 1 and 2. It is, however, beneficial if the ratio of resonance frequencies is as close to 1 as possible.

The following details the computation of the actuator offset d from line 2010. It will be noted that when the light beam is emitted from, for example, a point below line 2010, the distance $H_2$ of the end point $P_2$ of the scanning light beam at the working range will be larger than the distance $H_1$ of the start point $P_1$ of the reflected light beam at that working range. Correspondingly, if the light beam is emitted from a point above the line 2010, the distance $H_2$ of the end point $P_2$ of the scan line will be less than the distance $H_1$ of the start point $P_1$ of the scan line as a result of the curvature in the scan line.

The position of the reflected light beam on the plane 2006 is at point $P_1$ prior to rotation of the mirror 2002. Point $P_1$ is at a distance $H_1$ from line 2008. Distance $H_1$ is computed as $$H_2 = 2N_o \tan \beta' = 2H_o \quad (1)$$

As the mirror rotates by angle $\theta'$, the reflected light beam will come to the point $P_2$, thus traveling distance $X_o$ along the X-axis and distance $H_2$ along the Y-axis. The plane 2006 is defined by YOX and is the plane of the scanned barcode or other indicia at the maximum working distance of the scanner. Using conventional geometry and trigonometry relations:

$$\cos \phi' = \cos \beta' \cos \theta' \quad (2)$$

the angle $\alpha'$ is computed by:

$$\cos\alpha' = \frac{\sin^2\beta'\cos\theta'}{\sin^2\theta'\cos^2\beta' + \sin^2\beta'\cos^2\theta'} \quad (3)$$

the distance D is computed by:

$$D = \frac{N_o}{\cos\beta'} \frac{\sin^2\phi'}{\sin[180 - 2\phi' - \alpha']} \quad (4)$$

Next the position of the scan spot $P_2$ is computed:

$$X = N_o \tan 2\theta' \quad (5)$$

$$H_2 = \frac{N_o\sin2\phi'\sin\delta'}{\cos\beta'\sin[180 - 2\phi' - \alpha']} \quad (6)$$

$$\cos\delta' = \tan2\theta'\cos\beta'\sin[180 - 2\phi' - \alpha'] \quad (7)$$

The difference in the Y-coordinates of the traveling spot, $\Delta$, is calculated from:

$$\Delta = H_2 - H_1 = H_2 - 2H_o = \quad (8)$$

$$N_o \left[ \frac{\sin2\phi'\sin\delta'}{\cos\beta'\sin[180 - 2\phi' - \alpha'] - 2\tan\beta} \right]$$

The correction angle $\delta'$ is calculated:

$$\delta' = \arctan\left[ \frac{\Delta}{N_3} \right] \quad (9)$$

and $$N_3 = \frac{N_o\sin2\alpha'}{\beta'\sin[180 - 2\phi' - \alpha']}$$

By incrementing the angle $\theta'$ from O to $\theta'$ max in steps of $\Delta\theta'$, and knowing $N_o$, the distance from the mirror 2002 to indicia plane 2006 and the angle $\beta'$, the angle of the laser beam 2000 with respect to mirror normal $N_4$, using the above formulas, the trajectory of the laser spot and the deviation of the scan line from a straight line, i.e., the scan line's curvature, is computed. By suitably offsetting the actuator 2016 from the line 2010 of the flex support 2014 by a distance of d a moment is created which will twist the flex support 2014 and rotate the mirror 2002 by an angle $\delta'$ in the direction $\Psi'$. The natural frequencies of the flex support member 2014 in bending ($W_B$) and torsion ($W_T$) is computed and the total damping C (e.g. 0.1, 0.15, etc.) is estimated in a conventional manner. Using well known relations between forces, moments and rotations the offset distance d is computed by:

$$d = \frac{\delta'}{\theta'} \frac{L_f}{2c(1+v)} \frac{1}{1 - \left(\frac{W_B}{W_T}\right)^2} \quad (10)$$

where $v$ is the Poisson's Ratio, e.g., 0.3 for typical metal flex support members utilized in optical scanners, and $L_f$ is the length of the flex support member 2014 For example for $\theta'$max=10°, c≈0.1, $L_f$=1", and $$\frac{WB}{WT} = 1.5,$$

the offset d=0.084 inches

Figure 15:
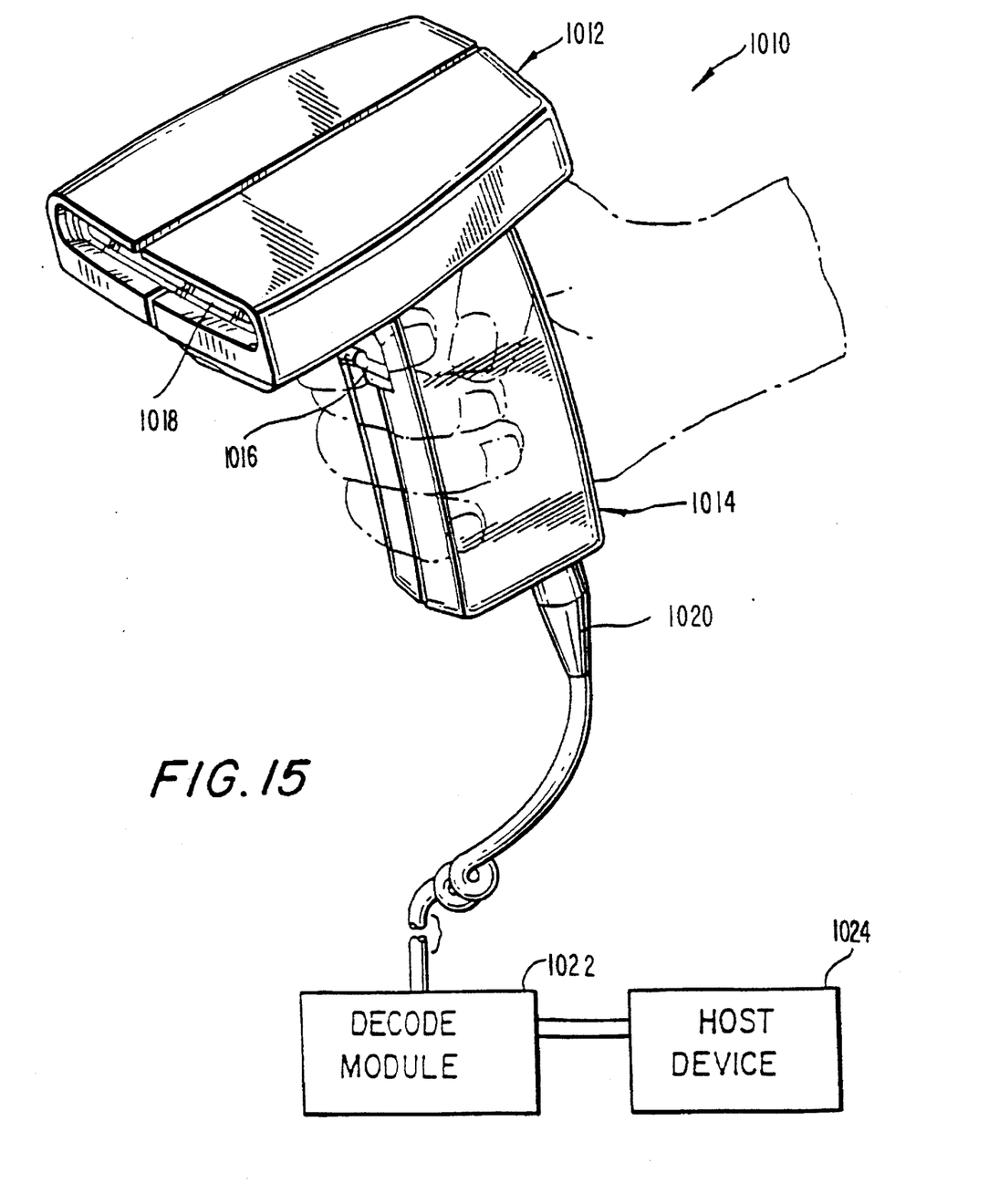
FIG. 15 illustrates a scanner head which could house any of the scanning devices described above.

As shown in FIG. 15, reference numeral 1010 generally identifies a hand-held, gun-shaped scanner having a barrel 1012 and a handle 1014. The head need not be gun-shaped as any suitable configuration may be used, such as box-like. A manually-operable trigger 1016 is situated below the barrel 1012 on an upper, forwardly-facing part of the handle 1014. As known from the above-identified patents and applications incorporated by reference herein, a light source component, typically, but not necessarily, a laser, is mounted inside the head 1010. The light source emits a light beam along a transmission path which extends outwardly through a window 18 that faces indicia, e.g. bar code symbols, to be read. Also mounted within the head is a photodetector component, e.g. a photodiode, having a field of view, and operative for collecting reflected light returning through the window 1018 along a return path from the symbol.

A scanner component is mounted within the head 1010, and is operative for scanning the symbol and/or the filed of view of the photodetector. The scanner component includes at least one light reflector positioned in the transmission path and/or the return path. The reflector is driven by an electrically-operated drive to oscillate in alternative circumferential directions, preferably at the resonant frequency of the scanner component.

The photodetector generates an electrical analog signal indicative of the variable intensity of the reflected light. This analog signal is converted into a digital signal by an analog-to-digital converter circuit. This digital signal is conducted, according to one embodiment, along an electrical cable 1020 to a decode module 1022 located exteriorly of the head 1010. The decode module 1022 decodes the digital signal into data descriptive of the symbol. An external host device 24, usually a computer, serves mainly as a data storage in which the data generated by the decode module 1022 is stored for subsequent processing.

In operation, each time a user wishes to have a symbol read, the user aims the head at the symbol and pulls the trigger 1016 to initiate reading of the symbol. The trigger 1016 is an electrical switch that actuates the drive means. The symbol is repetitively scanned a plurality of times per second, e.g. 40 times per second. As soon as the symbol has been successfully decoded and read, the scanning action is automatically terminated, thereby enabling the scanner to be directed to the next symbol to be read in its respective turn.

In addition, the head need not be a portable hand held type as fixedly mounted heads are also contemplated in this invention. Furthermore, the heads may have manually operated triggers or may be continuously operated by direct connection to an electrical source.

The oscillations need only last a second or so, since the multiple oscillations, rather than time, increase the probability of getting a successful decode for a symbol, even a poorly printed one. The resonating reflector has a predetermined, predictable, known, generally uniform, angular speed for increased system reliability.

The hand-held gun-shaped scanner head shown in FIG. 15 can be used to house any of the described scanning devices which implement the disclosed techniques for straightening the curvature of the scan line.

From the foregoing, it becomes readily apparent that the inventive scanning structure and method is adapted to eliminate or substantially ameliorate problems encountered due to the presence of curvilinear scan lines generated by bar code readers or scanners of the type considered herein, so as to appreciable increase the quality and accuracy of scanning operations.

While there has been shown and described what are considered to be preferred embodiments of the invention, it will of course be understood that various modifications and changes in form or detail could readily be made without departing from the spirit of the invention. It is therefore intended that the invention be not limited to the exact form and detail herein shown and described, nor to anything less than the whole of the invention herein disclosed as hereinafter claimed.

What is claimed is:

1. A scanner for reading indicia having portions of differing light reflectivity by directing a light beam to a planar scan element at an angle other than normal to all axis of rotation of the scan element so that as the scan element is moved about said axis of rotation the light beam is directed from said scan element towards a remote target and a scan line formed on the target normally results in a slight non-linear curvature of the scan line at remote ends thereof, said scanner comprising:

a) a scan element;

b) holder means mounting said scan element for oscillating movement around an axis of rotation; and c) an actuator for imparting a force to said scan element thereby moving said scan element in a first direction directing a light beam along a first scanning axis to produce a scan line on the target, said force being applied eccentrically relative to an axis of symmetry of said scan element which is substantially normal to said axis of rotation so as to generate a compensating force on said scan element having a component that is manifested during that portion of the scanning/oscillatory cycle corresponding to the formation of the ends of the scan line on the target, thereby correcting for the curvature thereof and imparting an enhanced degree of linearity to the scan line.

2. The scanner of claim 1, wherein said force actuates a vibration at a predetermined frequency in said scan element in a second direction perpendicular to said first direction.

3. The scanner of claim 1, wherein said actuator includes a coil attached to a first element, and a magnet attached to a second element and means for applying a current to said coil so as to impart a resulting force between said first and second elements.

4. The scanner of claim 3, wherein said holder means is a planar spring.

5. The scanner of claim 4, wherein said planar spring has a longitudinal axis of symmetry aligned with a common axis of symmetry of said first and second elements.

6. The scanner of claim 4, wherein said planar spring has a longitudinal axis of symmetry which is aligned with said axis of symmetry of said scan element which is substantially perpendicular to said axis of rotation of said scan element, and said force being applied at a position offset from said axis of symmetry of said scan element.

7. The scanner of claim 4, wherein said planar spring has an axis of symmetry offset with respect to the axis of symmetry of said scan element.

8. The scanner of claim 1, wherein said holder means includes a U-shaped spring.

9. The scanner of claim 1, wherein said holder means is a spring with two arms of different lengths.

10. The scanner of claim 1, wherein the scan element is a mirror.

11. A scanner for reading indicia having portions of differing light reflectivity, said scanner comprising:

(a) a planar scan element;

(b) a support holding said scan element for primary oscillation about a first axis of rotation;

(c) a light source for producing a light beam which is reflected off said scan element and directed towards a remote target to produce a single scan line on said target, said light beam impinging on said scan element at a non-zero angle to a normal axis of the scan element; and (d) an actuator for imparting a force to said scan element to effect said primary oscillation, said support and said actuator together imparting a secondary twisting force component on said scan element, thereby causing a consequential secondary vibration of said scan element about a second axis, perpendicular to said first axis, thereby changing the linearity of the scan line on said target.

12. The scanner of claim 11, wherein said support has a longitudinal axis of symmetry, said scan element being mounted to said support eccentrically with respect to said axis of symmetry.

13. The scanner of claim 11 wherein said support has a longitudinal axis of symmetry, said actuator applying said force eccentrically with respect to said axis of symmetry.

14. The scanner of claim 11 wherein said support is a leaf spring.

15. The scanner of claim 14, wherein said leaf spring comprises a first spring portion for mounting said scan element, and a second spring portion for mounting said first spring portion, the first and second spring portions having respective axes of symmetry, said axes being offset one from the other.

16. A method of operating a scanner for reading indicia having portions of differing light reflectivity, the method comprising the steps of:

a) applying an impulse force to a suspended planar scan element to effect primary oscillation of said scan element about a first axis of rotation;

b) applying a secondary twisting force component on said scan element to effect a consequential secondary vibration of said scan element about a second axis, perpendicular to said first axis; and c) directing a light beam to said scan element, said beam impinging on said scan element at a non-zero angle to a normal axis of said scan element, said beam being reflected towards a remote target to produce a single scan line across said target.

* * * * *